April 25, 1944.  W. B. GURNEY  2,347,318
METHOD OF AND APPARATUS FOR TREATING LIQUID
Filed Dec. 16, 1939  2 Sheets-Sheet 2
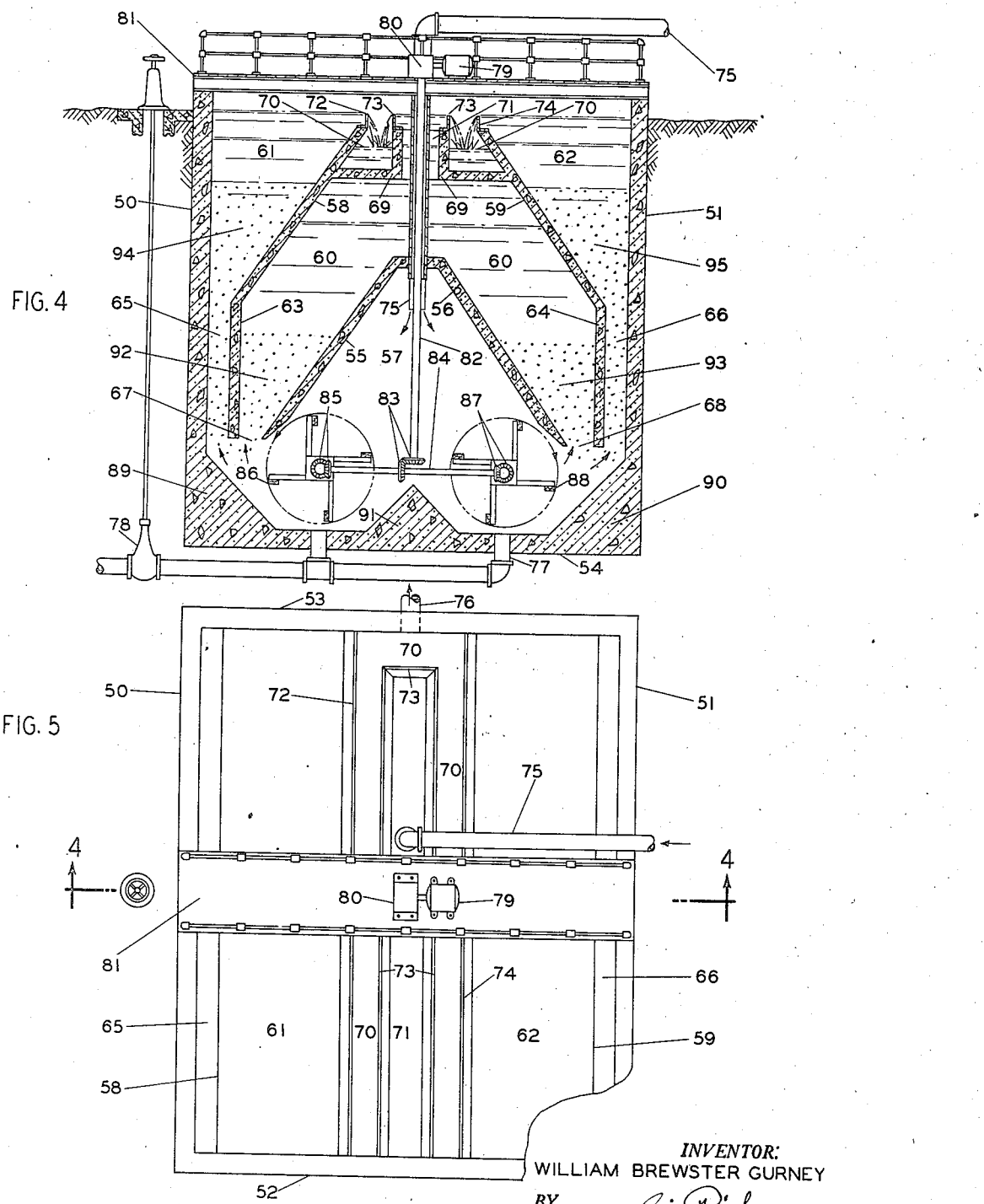
INVENTOR:
WILLIAM BREWSTER GURNEY
BY
ATTORNEY Patented Apr. 25, 1944

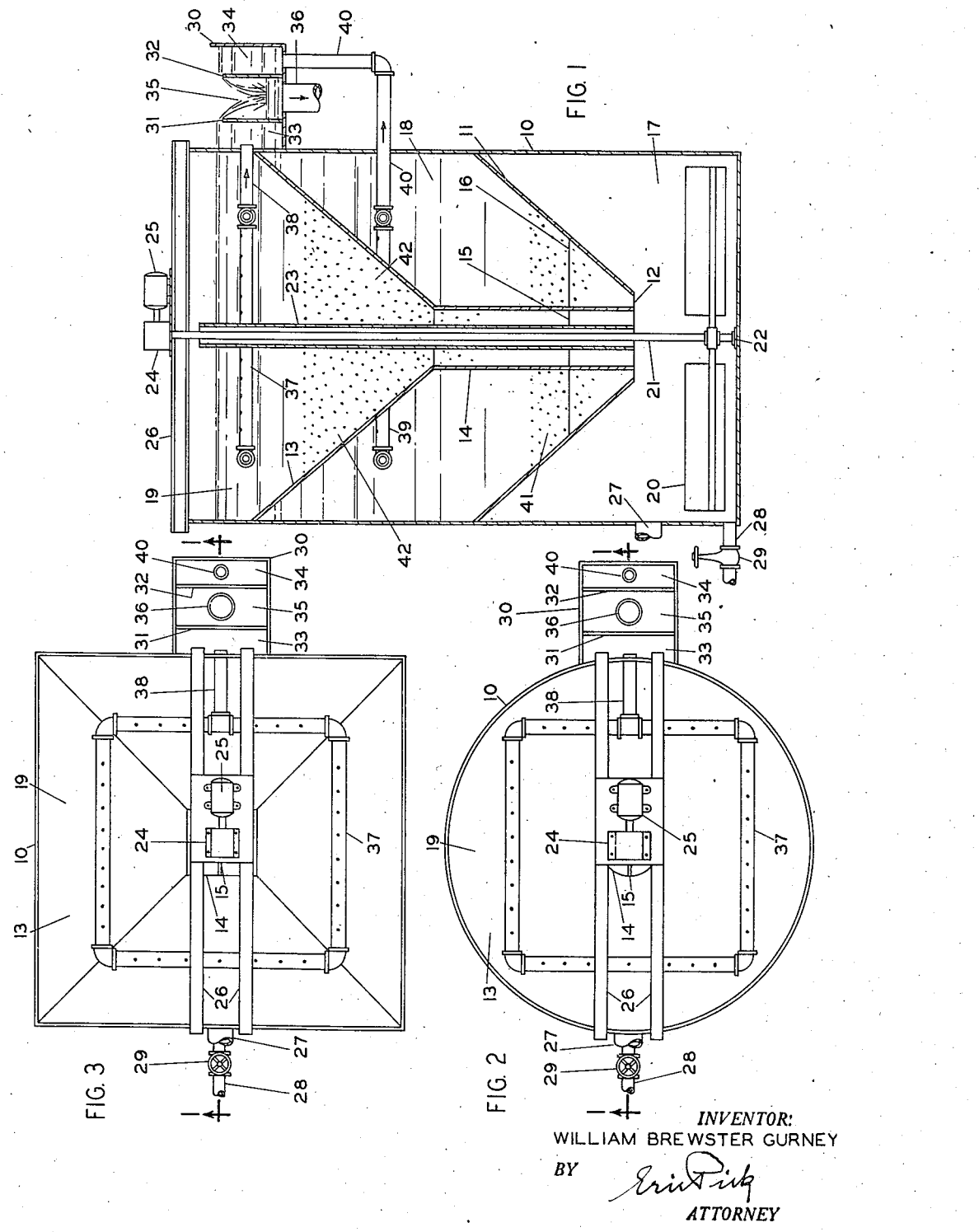

2,347,318

UNITED STATES PATENT OFFICE 2,347,318

METHOD OF AND APPARATUS FOR TREATING LIQUID

William Brewster Gurney, Baton Rouge, La., assignor to The Permutit Company, New York, N. Y., a corporation of Delaware Application December 16, 1939, Serial No. 309,548

13 Claims. (Cl. 210—16)

This invention relates to method of and apparatus for treating liquid; and it comprises a tank, partition means dividing the tank into a coagulating vessel and a precipitating section, other partition means dividing the precipitating section into a plurality of chambers, passages interconnecting each of said chambers with the coagulating vessel, agitator means in the coagulating vessel, means for supplying liquid to be treated and liquid treating chemical to the coagulating vessel, and means for withdrawing treated liquid from each of said chambers; all as more fully set forth hereinafter and as claimed.

This invention is an improvement on liquid treating apparatus of the general type disclosed in the Spaulding Patent No. 2,021,672, dated November 19, 1935, wherein liquid to be treated and liquid treating chemical are passed into a coagulating vessel, mixed and agitated therein by means of a mechanical agitator and the mixture is then passed upwardly at decreasing velocity through a precipitating vessel wherein a sludge filter is maintained which aids the precipitation and separation of matter to be removed from the liquid, clear treated liquid being withdrawn from the upper portion of the precipitating vessel.

The objects of my invention are, first, to provide an apparatus of the aforementioned type wherein a larger quantity of liquid can be treated per unit of floor space; secondly, to provide an apparatus suitable for large scale liquid treatment in which a larger quantity of liquid can be treated within a given tank volume; and thirdly, to provide an apparatus in which agitating means of a given size with power means of a given rating suffice for a larger quantity of liquid.

The manner in which the foregoing objects are achieved is shown in the appended drawings in which—

Fig. 1 is an elevation of an apparatus according to my invention, in cross-section along line 1—1 of Figs. 2 and 3;

Figs. 2 and 3 are alternative plan views of the apparatus shown in Fig. 1;

Fig. 4 is an elevation of another modification, in cross-section along line 4—4 of Fig. 5; and Fig. 5 is a plan view of the apparatus shown in Fig. 4.

Similar reference characters refer to similar parts throughout the several figures.

Referring now to Figs. 1 to 3, a tank 10 which may be of cylindrical shape as shown in Fig. 2, or of rectangular shape as shown in Fig. 3, is provided with a funnel-shaped partition 11 having a central opening 12 and dividing the tank into a lower coagulating vessel 17 and an upper precipitating section. Above the partition 11 is a second similar funnel-shaped partition 13 provided with a vertical conduit 14 extending downwardly to the level of the opening 12. In the cylindrical tank the funnel-shaped partitions 11 and 13 are of conical shape whereas in the tank of rectangular cross section the partitions are shaped as pyramids. The conduit 14 is preferably made of such size that its cross-sectional area is equal to approximately one-half of the area of the opening 12. Within the conduit 14 are radial baffles 15 and extending from the wall of conduit 14 to the funnel-shaped partition 11 are other radial baffles 16. The upper partition 13 divides the precipitating section into a lower precipitating chamber 18 and an upper precipitating chamber 19. Within the coagulating vessel 17 is an agitator 20 mounted on a vertical shaft 21 which runs in a bearing 22 and is enclosed in a protecting tube 23. The shaft 21 is rotated through a speed reducer 24 by means of a motor 25 mounted on beams 26 on top of tank 10. An inlet 27 for liquid and liquid treating chemical is in communication with the coagulating vessel 17 to which is also connected a sludge outlet 28 provided with a valve 29. Adjacent the top of tank 10 is an outlet box 30 provided with weirs 31 and 32 which divide the box into compartments 33 and 34 and a discharge chamber 35 to which latter an outlet 36 is connected. In the upper precipitating chamber 19 is a perforated collector 37 connected to chamber 33 by means of pipe 38, and in the lower precipitating chamber 18 is another perforated collector 39 connected to chamber 34 by means of pipe 40.

In operation of the device shown in Figs. 1 to 3, liquid and chemical for the treatment of this liquid are admitted through inlet 27 into the coagulating vessel 17 where they are subjected to gentle agitation by the rotating agitator 20. From the coagulating vessel part of the liquid flows through the annular opening 12 past baffles 16 into the lower precipitating chamber 18 while the remainder flows past baffles 15 through conduit 14 into the upper precipitating chamber 19. In the precipitating chambers 18 and 19 the water flows upwardly at decreasing velocity, maintaining precipitates in suspension to form sludge filters 41 and 42, respectively, which are material in effecting rapid and thorough liquid treating reactions. Part way up in the precipitating chambers the velocity of the liquid decreases to such extent that it can no longer maintain the precipitates in suspension. The precipitated matter then stays behind and clear liquid flows through the respective collectors 37 and 39 and pipes 38 and 40 to chambers 33 and 34, falling over weirs 31 and 32 into discharge chamber 35 whence the two streams pass jointly through outlet 36. Weirs 31 and 32 being of equal width and of equal height effectively regulate the rate of flow of the two streams in such manner that the two streams are equal. If desired, one stream may be made larger than the other by changing the relative length or height of weirs 31 and 32. Other flow controlling or flow limiting devices, such as orifices in pipes 38 and 40, may be substituted for the weirs. Accumulated precipitates are removed either periodically or continuously through sludge outlet 28 under the control of valve 29.

Referring now to the modification shown in Figs. 4 and 5 which is of the general type disclosed in the co-pending patent of James M. Montgomery and William W. Aultman, No. 2,264,139, dated November 25, 1941, a tank comprises side walls 50 and 51, end walls 52 and 53 and a rectangular bottom 54. Within the tank are inclined walls 55 and 56 joined together at the top and terminating short of the side walls 50 and 51. These inclined walls divide the tank into a lower coagulating vessel 57 and an upper precipitating section. Above the inclined walls 55 and 56 and parallel thereto are inclined walls 58 and 59 dividing the precipitating section into a lower precipitating chamber 60 and two upper precipitating chambers 61 and 62. Vertical walls 63 and 64 joined to the lower ends of the upper inclined walls 58 and 59, respectively, define vertical passages 65 and 66 leading from the coagulating vessel 57 to the precipitating chambers 61 and 62, respectively, and openings 67 and 68 leading to the lower precipitating chamber 60. Between the inclined walls 58 and 59 and near their upper ends is a wall 69 forming a U-shaped discharge chamber 70 and a vertical passage 71 communicating with the lower precipitating chamber 60. On the top edge of inclined wall 58 is mounted a weir 72, on the top edge of the wall 69 is mounted a U-shaped weir 73 and on top of inclined wall 59 is mounted a weir 74. The combined length of weirs 72 and 74 is approximately equal to the length of the U-shaped weir 73, and all three weirs are so arranged that their edges are on the same level. An inlet 75 for liquid and chemical for the treatment thereof passes into coagulating vessel 57 and an outlet 76 for treated liquid is connected to the U-shaped discharge chamber 70 as shown. A branched sludge outlet 77 in communication with the coagulating vessel 57 is provided with a valve 78. A motor 79 with a gear reduction 80 is mounted on a platform 81 on top of the apparatus and drives a vertical shaft 82 which, through bevel gears 83, rotates a horizontal shaft 84. The horizontal shaft 84 drives, through bevel gears 85, a horizontal agitator 86 and, through bevel gears 87, a horizontal agitator 88 in such manner that the agitators 86 and 88 rotate in opposite directions. The corners between side walls 50, 51 and the bottom 54 are filled in as shown at 89 and 90, and a central ridge 91 is placed on the bottom of the tank; in this manner dead and stagnant spaces beyond the reach of the agitators are prevented.

Operation of the apparatus shown in Figs. 4 and 5 is similar to that of the apparatus shown in Figs. 1 to 3. Liquid and chemical for the treatment thereof enter through inlet 75 into the coagulating vessel 57 and are subjected to gentle agitation. The mixture is then divided into four streams passing upwardly through openings 67 and 68 into the lower precipitating chamber 60 and through passages 65 and 66 into the upper precipitating chambers 61 and 62, respectively. Within the precipitating chambers sludge filters 92, 93, 94 and 95 are maintained as shown and clear treated liquid passes from chambers 61 and 62 over weirs 72 and 74 into discharge chamber 70 while the combined streams of treated liquid from the precipitating chamber 60 pass through the vertical passage 71 and then flow over the U-shaped weir 73 into discharge chamber 70. The treated liquid leaves the apparatus in a single stream through outlet 76. Sludge is removed either intermittently or continuously through outlet 77.

The apparatus of Figs. 4 and 5 has been illustrated in concrete construction which is particularly advantageous for large size apparatus but it may, of course, be executed in steel, as is the apparatus shown in Figs. 1 to 3.

In either of the modifications shown the subdivision of the precipitating section into a plurality of chambers permits the treatment, within a given tank volume and on a given floor space, of a much greater quantity of liquid than when only a single precipitating vessel is used. Furthermore the agitating device of a given size likewise serves a greater quantity of liquid all of which makes the apparatus more compact and more economical to construct.

An apparatus in accordance with my invention is particularly useful for the softening of water by the addition of lime but it may, of course, be used for other liquids and other types of treatment involving precipitation of dissolved matter or coagulation and removal of suspended matter. While I have shown a single inlet for liquid and liquid treating chemical, separate inlets may be provided if desired. The precipitating section may be divided into more than two vertically spaced sets of chambers by the use of additional inclined partitions. Other modifications of the apparatus shown and described herein may be made without departing from the spirit of my invention, and reference is therefore made to the following claims for a definition of the scope of my invention.

What I claim is:

1. The method of treating liquid which comprises mixing said liquid with a treating agent in a coagulating zone, flowing the mixture of liquid, treating agent, and partly formed sludge upwardly from said coagulating zone in separate and divided streams into a plurality of precipitating zones, flowing the respective portions of said mixture upwardly in each of said precipitating zones at decreasing velocity, maintaining a sludge filter bed suspended in each of said precipitating zones, removing excess sludge from the liquid being treated, withdrawing clarified liquid from said precipitating zones, and maintaining a predetermined relation between the rates of flow of said divided streams.

2. Apparatus for treating liquid comprising a tank, a coagulating chamber in said tank, means for introducing liquid and treating agent into said chamber, means in said chamber for mixing said liquid and said treating agent, wall means forming a plurality of separate precipitating zones in said tank, a plurality of separate passage means providing for the flow of mixed liquid, treating agent and partly formed sludge in divided streams into said precipitating zones and for causing said streams of said mixture to rise with decreasing velocity in the respective precipitating zones to maintain a sludge filter bed in each of said zones, means for removing excess sludge from said tank, and means for withdrawing clarified liquid from said precipitating zones.

3. Apparatus for treating liquid which comprises a tank, partition means dividing said tank into a lower coagulating vessel and an upper precipitating section, other partition means above the first named partition means dividing the precipitating section into a plurality of chambers, agitator means in the coagulating vessel, means for moving the agitator means, means for supplying liquid to be treated and liquid treating chemical to the coagulating vessel, means forming a plurality of separate passages each connecting the lowermost portion of one of said chambers of said precipitating section with said coagulating vessel, means for removing excess sludge from said tank, and means for withdrawing treated liquid from said chambers.

4. Apparatus for treating liquid which comprises a tank, partition means dividing said tank into a coagulating vessel and a precipitating section, other partition means dividing the precipitating section into a plurality of chambers, agitator means in the coagulating vessel, means for moving the agitator means, means for supplying liquid and liquid treating chemical to the coagulating vessel, separate passages each connecting the lowest portion of one of the chambers of said precipitating section with said coagulating vessel, means for removing excess sludge from said tank, and means for withdrawing treated liquid from said chambers.

5. Apparatus for treating liquid which comprises a tank, sloping partition means dividing the tank into a lower coagulating vessel and an upper precipitating section and defining an opening through which the coagulating vessel and the precipitating section communicate with each other, other sloping partition means above the first named partition means dividing the precipitating section into upper and lower chambers, passage means extending from said other partition means to the coagulating vessel and interconnecting the upper of said chambers with the coagulating vessel, agitator means in the coagulating vessel, means for moving the agitator means, means for supplying liquid to be treated and liquid treating chemical to the coagulating vessel, means for removing excess sludge from said tank, and means for withdrawing treated liquid from each of said chambers.

6. Apparatus for treating liquid which comprises a tank, sloping partition means dividing the tank into a lower coagulating vessel and an upper precipitating section, other sloping partition means above the first named partition means dividing the precipitating section into a plurality of superimposed chambers, separate passage means interconnecting each of said chambers with the coagulating vessel, agitator means in the coagulating vessel, means for moving the agitator means, means for supplying liquid to be treated and liquid treating chemical to the coagulating vessel, means for removing excess sludge from said tank, discharge means for withdrawing treated liquid from each chamber of the precipitating section, and means for maintaining a predetermined relation between the rates of flow of treated liquid from the respective chambers of the precipitating section.

7. Apparatus for treating liquid which comprises a tank, sloping partition means dividing the tank into a lower coagulating vessel and an upper precipitating section and defining an opening through which the coagulating vessel and the precipitating section communicate with each other, other sloping partition means above the first named partition means dividing the precipitating section into upper and lower chambers, passage means extending from said other partition means to the level of said opening and interconnecting the upper of said chambers with the coagulating vessel, agitator means in the coagulating vessel, means for moving the agitator means, means for supplying liquid to be treated and liquid treating chemical to the coagulating vessel, a collecting compartment, an outlet for the collecting compartment, means for discharging liquid from each of said chambers into said collecting compartment comprising a plurality of weirs, one of said weirs being adapted to discharge treated liquid from the upper chamber into the collecting compartment, another of said weirs being adapted to discharge treated liquid from a lower chamber into the collecting compartment, means for removing excess sludge from said tank, and passage means connecting said lower chamber with said other weir.

8. Apparatus for treating liquid which comprises a tank, a funnel shaped partition dividing the tank into a lower coagulating vessel and an upper precipitating section and having an opening in its lowermost part, a second funnel shaped partition dividing the precipitating section into an upper and a lower chamber, passage means extending from the upper chamber to the level of the opening and interconnecting the upper chamber with the coagulating vessel, an agitator in the coagulating vessel, means for rotating the agitator, means for supplying liquid to be treated and liquid treating chemical to the coagulating vessel, means for removing excess sludge from said tank, and means for withdrawing treated liquid from each chamber.

9. Apparatus for treating liquid which comprises a cylindrical, upright tank, a partition in the form of an inverted frusto-conical member dividing the tank into a lower coagulating vessel and an upper precipitating section, an opening in the conical partition, another partition in the form of an inverted frusto-conical member above the first named partition dividing the precipitating section into an upper and a lower chamber, a conduit extending from the upper chamber to said opening and having a free cross-sectional area approximately equal to half the area of the opening, an agitator in the coagulating vessel, means for rotating the agitator, means for supplying liquid to be treated and liquid treating chemical to the coagulating vessel, means for removing excess sludge from said tank, and means for withdrawing treated liquid from each chamber.

10. Apparatus for treating liquid which comprises a tank having a bottom, a partition in the shape of an inverted pyramid dividing the tank into a lower coagulating vessel and an upper precipitating section, another partition in the shape of an inverted pyramid dividing the precipitating section into an upper and a lower chamber, passage means interconnecting the coagulating vessel with each chamber, agitator means in the coagulating vessel, means for rotating the agitator means, means for supplying liquid to be treated and liquid treating chemical to the coagulating vessel, means for withdrawing excess sludge from said tank, and means for withdrawing treated liquid from each chamber.

11. Apparatus for treating liquid which comprises a tank having a rectangular bottom, side walls and end walls, an inclined partition extending from one end wall to the other and terminating short of one side wall thus defining an opening between said one side wall and the inclined wall, the inclined wall dividing the tank into a lower coagulating vessel and an upper precipitating section, another partition substantially parallel to the first named partition and terminating short of said one side wall and dividing the precipitating section into an upper and a lower chamber, passage means extending from the upper chamber to the coagulating vessel, agitating means in the coagulating vessel, means for moving the agitating means, means for supplying liquid to be treated and liquid treating chemical to the coagulating vessel, means for removing excess sludge from said tank, and means for withdrawing treated liquid from each chamber.

12. Apparatus for treating liquid which comprises a tank having a rectangular bottom, side walls and end walls, a pair of walls inclined toward each other, extending from one end wall to the other and having their lower edges terminating short of the side walls, said walls defining a lower coagulating vessel and an upper precipitating section, another pair of inclined walls parallel to the first named pair of walls and dividing the precipitating section into upper and lower chambers, passage means interconnecting the upper chambers with the coagulating vessel, agitator means in the coagulating vessel, means for moving the agitator means, means for supplying liquid to be treated and liquid treating chemical to the coagulating vessel, means for removing excess sludge from said tank and means for withdrawing treated liquid from each chamber.

13. Apparatus for treating liquid which comprises an upright tank having a bottom and side wall means, a partition attached to said side wall means and sloping toward the axis of said tank and dividing said tank into a lower coagulating vessel and an upper precipitating section, other partition means attached to said side wall means above said partition and sloping toward the axis of said tank and dividing said precipitating section into superimposed chambers, passage means interconnecting said coagulating vessel with each of said chambers, said passage means comprising openings in the lowermost portions of said partition and of said partition means, agitator means in the coagulating vessel, means for rotating said agitator means, means for supplying liquid to be treated and liquid treating chemical to the coagulating vessel, means for removing excess sludge from said tank, discharge means for withdrawing treated liquid from each of said chambers, and means for maintaining a predetermined relation between the rates of flow of treated liquid from the respective chambers of the precipitating section.

WILLIAM BREWSTER GURNEY.